United States Patent [19]
Takara et al.

[11] Patent Number: 5,205,078
[45] Date of Patent: Apr. 27, 1993

[54] ROTARY APPARATUS

[75] Inventors: Akira Takara, Moriguchi; Toru Nakagawa, Hirakata, both of Japan

[73] Assignee: Matsushita Electric Industrial Co., Ltd., Osaka, Japan

[21] Appl. No.: 750,985

[22] Filed: Aug. 28, 1991

[30] Foreign Application Priority Data

Aug. 28, 1990 [JP] Japan .................................. 2-228562

[51] Int. Cl.⁵ .............................................. B24B 49/02
[52] U.S. Cl. ............................... 51/165.77; 51/165.9;
51/165.93; 51/134.5 F
[58] Field of Search ............. 51/165.71, 165.77, 165.9,
51/165.92, 165.93, 134.5 R, 134.5 F

[56] References Cited

U.S. PATENT DOCUMENTS

| | | | |
|---|---|---|---|
| 4,180,946 | 1/1980 | Heijkenskjold et al. ...... | 51/134.5 R |
| 4,852,306 | 8/1989 | Harmand ......................... | 51/241 VS |
| 4,956,945 | 9/1990 | Ooshima ........................... | 51/165.77 |
| 5,024,025 | 6/1991 | Kihara et al. .................... | 51/165.9 |
| 5,027,280 | 6/1991 | Ando et al. ...................... | 51/134.5 |

Primary Examiner—M. Rachuba
Attorney, Agent, or Firm—Wenderoth, Lind & Ponack

[57] ABSTRACT

A rotary apparatus includes a rotary spindle, a front end portion of which projects from a shell to an outside thereof and which is supported by magnetic force while the spindle is rotating, a working tool being mountable on the front end portion of the spindle. A first sensor is provided for detecting a position of the front end portion of the spindle in a radial direction thereof and is provided on the front end portion of the shell and in an annular space formed at a periphery of the front end portion of the spindle such that the first sensor occupies a volume of not more than 50% of the annular space. A second sensor is provided, for detecting a position of a rear end portion of the spindle in the radial direction thereof and is provided on the rear end portion of the shell.

5 Claims, 1 Drawing Sheet

ROTARY APPARATUS

BACKGROUND OF THE INVENTION

The present invention relates to a rotary apparatus on which a working tool such as a grindstone is mounted.

A rotary apparatus having a spindle rotatably supported by magnetic attraction in a non-contact condition has the following advantages: the apparatus can be used in a vacuum; the loss or wear rate of a bearing is low; lubricating oil is not required; no noise is made; and maintenance-free operation is ensured.

As shown in FIG. 3, in the rotary apparatus, the front end portion 31 of a rotary spindle 30 penetrates the front wall of a shell 32, thus projecting from the shell 32 to the outside; the spindle 30 supported by radial bearing sections 33 and a thrust bearing 34 both provided in the shell 32 is driven by a driving section 35; and a working tool 36 such as a grindstone is mounted on the front end portion 31 of the spindle 30. The working tool 36 is mounted on the spindle 30 at a position spaced a predetermined distance from the front wall of the shell 32 and the working space of the working tool 36 is provided in the axial direction of the spindle 30.

Radial sensors 37 and 38 for detecting the positions of the spindle 30 in the radial direction are provided in the front and rear of the shell 32, respectively, to prevent deviation of the spindle 30 from the axis thereof. A thrust sensor 39 for detecting the position of the spindle 30 in the thrust direction thereof is provided in the inner surface of the rear wall of the shell 32.

However, according to the above-described conventional construction, since the front wall of the shell 32 is interposed between the radial sensor 37 inside the shell 32 and the front end portion 31 of the spindle 30 outside the shell 32, there is a great difference between the spindle deviation from the axis of the spindle 30 detected by the radial sensor 37 and the deviation of the front end thereof. Therefore, it is difficult to control the radial position of the spindle at the front end portion 31 thereof accurately.

Additionally, according to the conventional rotary apparatus using a magnetic bearing, since the radial sensors 37 and 38, the radial bearing 33, the thrust sensor 39, the thrust bearing 34, and the driving section 35 are provided in the shell 32 along the axis of the spindle 30, the axis of the spindle 30 of the rotary apparatus using the magnetic bearing is longer than that of the spindle of a rotary apparatus using a fluid bearing. Since the natural frequency of an axis is inversely proportional to its length, the natural frequency of the spindle of the apparatus using the fluid bearing is small. Therefore, according to the above-described conventional construction, the spindle has a resonance in a region in which the number of rotations thereof is low. As such, it is difficult to increase the number of rotations (i.e. the rotational speed) thereof.

SUMMARY OF THE INVENTION

Accordingly, an object of the present invention is to provide a rotary apparatus in which the deviation of a spindle can be controlled accurately at and the spindle is capable of rotating at high speeds.

In accomplishing this and other objects, there is provided a rotary apparatus comprising:

a rotary spindle, a front end portion of which projects from a shell to an outside thereof and which is lifted (or supported) by magnetic force while the spindle is rotating, a working tool being mounted on the front end portion of the spindle;

a first sensor, for detecting a position of the front end portion of the spindle in a radial direction thereof, provided on the front end portion of the shell and provided in an annular space formed at a periphery of the front end portion of the spindle such that the first sensor occupies a volume of not more than 50% of the annular space; and a second sensor, for detecting a position of a rear end portion of the spindle in the radial direction thereof, provided on the rear end portion of the shell.

According to the above construction, the radial position of the front end of the spindle can be accurately controlled by the first sensor provided in the annular space which is in the periphery of the front end of the shell not through the wall of the shell. Since the first sensor occupies a volume of not more than 50% in the annular space, more than 50% of the annular space can be used as working space for a working tool mounted on the front end portion of the spindle, for example, as a space for grinding a workpiece by moving the workpiece around the tool. Although the first sensor is provided in the vicinity of the front end of the spindle, the operation efficiency of the working tool, namely, the apparatus is not deteriorated.

Further, compared with the conventional rotary apparatus which requires space for accommodating a radial sensor in a shell, the first sensor according to the present invention is positioned outside the shell. Therefore, the shell is shorter than the conventional one, so that the axis of the spindle accommodated in the shell is shorter than that of the conventional spindle. Thus, the natural frequency of the spindle in accordance with the present invention can be increased to make the resonance frequency higher so that the spindle is capable of rotating at high speeds.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
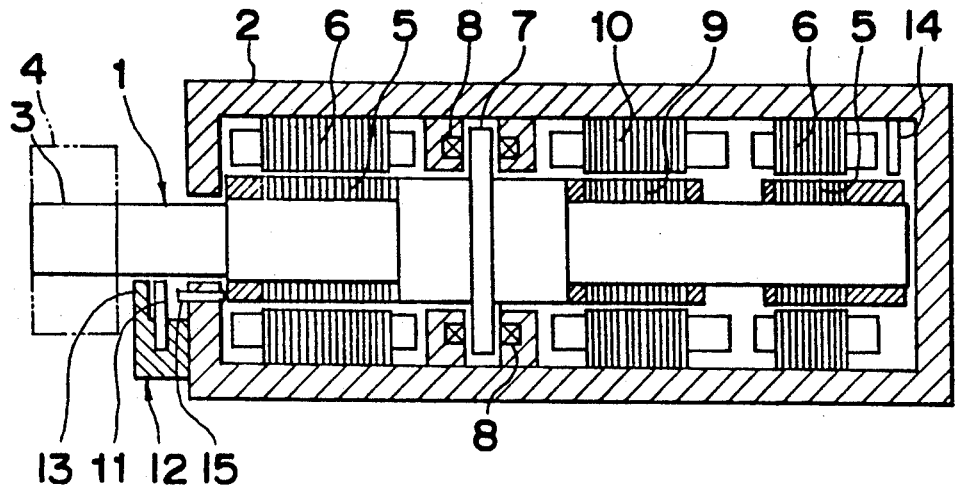
FIG. 1 is a longitudinal side elevation, in section, showing a rotary apparatus according to an embodiment of the present invention.
Figure 2:
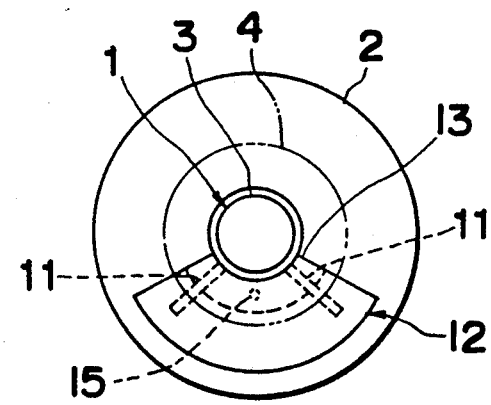
FIG. 2 is a front view of the apparatus shown in FIG. 1.

Referring to FIGS. 1 and 2, an embodiment of the present invention is described below.

A spindle 1 is made of a substance having a great magnetic force. A working tool such as a grindstone 4 can be mounted on the front end portion 3 of the spindle 1 penetrating through the front wall of a shell 2, thus projecting therefrom to the outside of the shell 2.

In the shell 2, two cylindrical portions 5, each made of a silicon steel plate and to be electromagnetically attracted, are mounted by shrinkage fit on the periphery of the spindle 1 in the front and rear of the spindle 1. Coils 6 are provided on the inner periphery of the shell 2 at positions corresponding to each cylindrical portion 5. The coils 6 electromagnetically attract each cylindrical portion 5 in the radial direction of the spindle 1. Thus, the cylindrical portions 5 and the coils 6 constitute a radial bearing for electromagnetically lifting and supporting the spindle 1 in the radial direction thereof so that the spindle 1 rotates.

An annular portion 7 made of a silicon steel plate is mounted by shrinkage fit on the periphery of the spindle 1 at a position a little forward from the center of the spindle 1. Coils 8 are provided in the inner periphery of the shell 2 at front and rear portions of the annular portion 7. The coils 8 electromagnetically attract the annular portion 7 in the thrust direction of the spindle 1. Thus, the annular portion 7 and the coils 8 constitute a thrust bearing for electromagnetically lifting and supporting the spindle 1 in the thrust direction thereof while the spindle 1 is rotating.

Thus, the spindle 1 can be supported in the radial and thrust directions while the spindle 1 is rotating.

A cylindrical motor rotor 9 made of a silicon steel plate is mounted by shrinkage fit on the periphery of the spindle 1 at a position a little backward from the center of the spindle 1. Motor stator coils 10 are provided in the inner periphery of the shell 2 at positions corresponding to the motor rotor 9. Thus, the motor rotor 9 and the motor stator coils 10 constitute a driving section for driving the spindle 1.

A pair of radial sensors 11 is provided on the outer surface of the front wall of the shell 2 as shown in FIGS. 1 and 2. The sensors 11 detect the position of the front end portion 3 of the spindle 1 in the radial direction. More specifically, the sensors 11 are mounted on a circular-arc bracket 12 attached to the shell 2 so that the detecting surfaces of the sensors 11 are opposed to the front end portion 3 of the spindle 1. Since the bracket 12 occupies a volume of not more than 50% in the annular space in the vicinity of the front end portion 3 of the spindle 1, more than 50% of the annular space can be used as the working space of the grindstone 4 mounted on the front end portion 3 of the spindle 1, namely, as the space for grinding a workpiece by moving the workpiece around the grindstone 4.

As shown in FIG. 1, the thickness of the bracket 12 is smaller than the interval between the grindstone 4 mounted on the front end portion 3 and the front wall of the shell 2. In order to prevent dust generated by an operation for grinding the workpiece with the grindstone 4 from scattering to the sensors 11 positioned in the vicinity of the front end portion 3 of the spindle 1, the bracket 12 is provided with a shielding section 13 extending, along the front wall of the shell 2, from the bracket 12 toward the front end portion 3 of the spindle 1. A radial sensor 14 for detecting the radial position of the rear end portion of the spindle 1 is provided in the rear inner surface of the shell 2 so that the sensor 14 is opposed to the radial sensor 11 in the radial direction of the spindle 1. The detecting surface of the radial sensor 14 is opposed to the peripheral surface of the side of the cylindrical portion 5 positioned rearward in the shell 2.

Thus, sensors 11 and 14 can detect the deviation of the spindle 1 from the axis thereof in the radial direction. In particular, the radial sensor 11 positioned in the vicinity of the front end portion 3 of the spindle 1 and opposed to the portion 3 thereof is capable of accurately detecting deviation of the front end portion 3 of the spindle 1 with respect to the axis thereof in the radial direction thereof.

Figure 3:
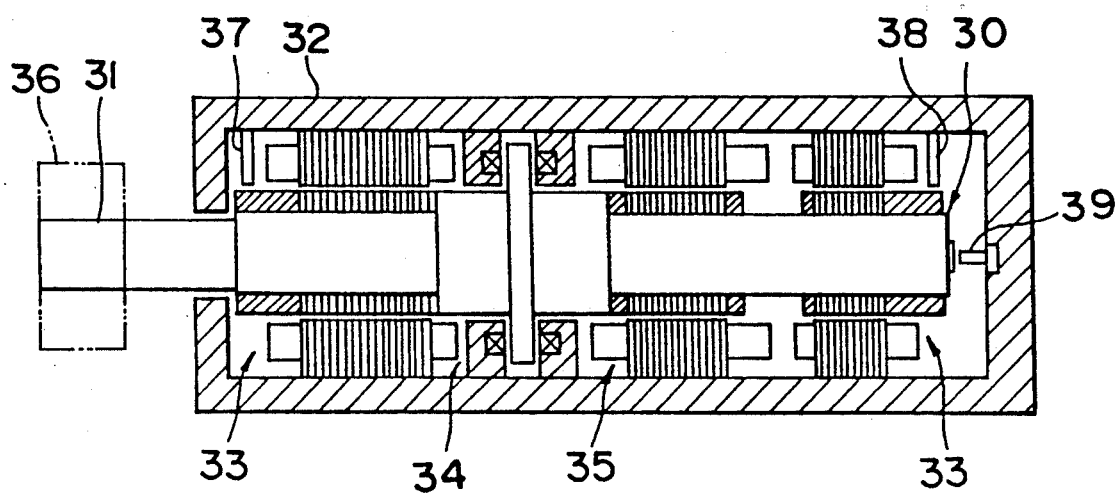
FIG. 3 is a longitudinal side elevation, in section, showing a conventional rotary apparatus.

Further, since the front radial sensor 11 is provided outside the shell 2, it is unnecessary to provide space for accommodating the radial sensor inside the shell, unlike the conventional apparatus as shown in FIG. 3. Therefore, the axis of the spindle 1 is shorter than that of the conventional one, so that the spindle 1 has a high resonance frequency. Thus, the spindle 1 is capable of rotating at a high speed.

A radially offset thrust sensor 15 for detecting the position of the spindle 1 in the thrust direction thereof is buried in the front wall of the shell 2. The detecting surface of the sensor 15 confronts the front end surface of the cylindrical portion 5 positioned forward in the shell 2. Thus, the sensor 15 detects the position of the spindle 1 accurately in the thrust direction thereof because the sensor 15 is positioned in the vicinity of the front end portion 3. This construction is capable of reducing errors in the detection position of the spindle 1 in the thrust direction thereof which are caused by thermal expansion of the spindle 1. More specifically, owing to the thrust sensor 15, positioning of the front end portion 3 in the thrust direction can be accurately controlled.

In addition to the above construction, the space for accommodating the sensor on the front end portion of the spindle may be appropriately varied depending on the kind and configuration of a working tool as well as the configuration and moving space of a workpiece.

As apparent from the foregoing description, since the deviation of the spindle at the front end thereof with respect to the axis thereof can be detected, the working tool mounted on the front end portion of the spindle is capable of efficiently performing its work. Further, the space for accommodating the radial sensor is not provided in the front portion of the shell but outside the shell. Consequently, the axis of the spindle is shorter than that of the conventional one and as a result, the spindle is capable of rotating at a high speed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rotary apparatus comprising:
   a shell;
   a rotary spindle mounted in said shell and having a front end portion extending to an outside of said shell and adapted to carry a working tool;
   magnetic bearings mounted in said shell and magnetically supporting said rotary spindle when said spindle rotates;
   a first sensor for detecting a radial position of said front end portion of said spindle relative to said shell;
   a second sensor for detecting a radial position of a rear end portion of said spindle relative to said shell;
   wherein said second sensor is mounted in a rear end portion of said shell;
   wherein said first sensor is mounted to a front end portion of said shell outside said shell; and
   wherein said first sensor occupies an arc-shaped area extending about less than 50% of a circumference of said spindle.

2. A rotary apparatus as recited in claim 1, further comprising
a third sensor for detecting an axial position of said front end portion of said spindle, said third sensor being mounted to said front end portion of said shell.

3. A rotary apparatus as recited in claim 2, wherein said third sensor is offset radially from said spindle.

4. A rotary apparatus as recited in claim 1, wherein said first sensor comprises an arc-shaped bracket mounted to said front end portion of said shell outside said shell, and a pair of radial sensor elements mounted to said bracket.

5. A rotary apparatus as recited in claim 4, wherein said first sensor further includes an arc-shaped shielding section mounted to said bracket, extending radially toward said spindle, and disposed on a side of said radial sensor elements opposite said front end portion of said shell.

* * * * *